(12) United States Patent
Lee et al.

(10) Patent No.: US 12,552,934 B2
(45) Date of Patent: Feb. 17, 2026

(54) POLYIMIDE-BASED POLYMER FILM, SUBSTRATE FOR DISPLAY DEVICE, AND OPTICAL DEVICE USING THE SAME

(71) Applicant: LG CHEM, LTD., Seoul (KR)

(72) Inventors: Min Wook Lee, Daejeon (KR); Kyunghwan Kim, Daejeon (KR); Chan Hyo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 749 days.

(21) Appl. No.: 17/912,351

(22) PCT Filed: Sep. 8, 2021

(86) PCT No.: PCT/KR2021/012174
§ 371 (c)(1),
(2) Date: Sep. 16, 2022

(87) PCT Pub. No.: WO2022/055235
PCT Pub. Date: Mar. 17, 2022

(65) Prior Publication Data
US 2023/0133697 A1   May 4, 2023

(30) Foreign Application Priority Data

Sep. 8, 2020 (KR) .................. 10-2020-0114807
Sep. 7, 2021 (KR) .................. 10-2021-0119263

(51) Int. Cl.
| | |
|---|---|
| *C08L 79/08* | (2006.01) |
| *C08G 73/10* | (2006.01) |
| *C08J 5/18* | (2006.01) |
| *G02B 1/04* | (2006.01) |

(52) U.S. Cl.
CPC .......... *C08L 79/08* (2013.01); *C08G 73/1057* (2013.01); *C08G 73/1067* (2013.01); *C08J 5/18* (2013.01); *G02B 1/04* (2013.01); *C08L 2201/08* (2013.01); *C08L 2201/10* (2013.01); *C08L 2203/16* (2013.01); *C08L 2203/20* (2013.01)

(58) Field of Classification Search
CPC ... C08J 2379/08; C08G 73/1067; C08L 79/08
See application file for complete search history.

(56) References Cited

U.S. PATENT DOCUMENTS

| | | |
|---|---|---|
| 2014/0256876 A1 | 9/2014 | Kim et al. |
| 2016/0251545 A1 | 9/2016 | Yun et al. |
| 2018/0208766 A1 | 7/2018 | Nakayama et al. |
| 2019/0048141 A1 | 2/2019 | Yun et al. |
| 2019/0062590 A1 | 2/2019 | Yun et al. |
| 2020/0131315 A1 | 4/2020 | Kim et al. |
| 2021/0238351 A1 | 8/2021 | Sung et al. |

FOREIGN PATENT DOCUMENTS

| | | |
|---|---|---|
| CN | 101602856 A | 12/2009 |
| CN | 108431088 A | 8/2018 |
| CN | 108431136 A | 8/2018 |
| CN | 108699242 A | 10/2018 |
| CN | 110799579 A | 2/2020 |
| JP | H05-112644 A | 5/1993 |
| JP | 2010-235641 A | 10/2010 |
| JP | 2013-001899 A | 1/2013 |
| JP | 2022-519404 A | 3/2022 |
| KR | 10-2015-0021296 A | 3/2015 |
| KR | 10-2017-0076096 A | 7/2017 |
| KR | 10-2017-0076101 A | 7/2017 |
| KR | 10-1796875 B1 | 11/2017 |
| KR | 10-2018-0031004 A | 3/2018 |
| KR | 10-2018-0081434 A | 7/2018 |
| KR | 10-1912738 B1 | 10/2018 |
| KR | 10-2019-0088778 A | 7/2019 |
| KR | 10-2020-0021263 A | 2/2020 |
| KR | 10-2020-0021264 A | 2/2020 |
| KR | 10-2020-0095745 A | 8/2020 |
| TW | 201341430 A | 10/2013 |
| TW | 201605977 A | 2/2016 |
| WO | 2019-188305 A1 | 10/2019 |
| WO | 2020-159174 A1 | 8/2020 |
| WO | 2020-159184 A1 | 8/2020 |

OTHER PUBLICATIONS

Abiko et al (WO 2019188306), published on Oct. 3, 2019.*
International Search Report issued for International Application No. PCT/KR2021/012174 on Dec. 30, 2021, 5 pages.

* cited by examiner

*Primary Examiner* — Gregory Listvoyb

(74) *Attorney, Agent, or Firm* — ROTHWELL, FIGG, ERNST & MANBECK, P.C.

(57) ABSTRACT

The present disclosure relates to a polyimide-based polymer film comprising a polyimide-based polymer containing a polyimide repeating unit synthesized by the reaction of an acid anhydride compound having a specific structure and a diamine compound, wherein a glass transition temperature is 400° C. or more, and a thickness direction retardation value at a thickness of 10 μm is 150 nm or less, and a substrate for a display device and an optical device using the same.

19 Claims, No Drawings

POLYIMIDE-BASED POLYMER FILM, SUBSTRATE FOR DISPLAY DEVICE, AND OPTICAL DEVICE USING THE SAME

CROSS-REFERENCE TO RELATED APPLICATION(S)

This application is a 35 U.S.C. 371 National Phase Entry Application from PCT/KR2021/012174 filed on Sep. 8, 2021, which claims the benefit of Korean Patent Application No. 10-2020-0114807 filed on Sep. 8, 2020 and Korean Patent Application No. 10-2021-0119263 filed on Sep. 7, 2021 in the Korean Intellectual Property Office, the disclosures of which are incorporated herein by reference in their entirety.

TECHNICAL FIELD

The present disclosure relates to a polyimide-based polymer film that has high heat resistance and can realize excellent optical properties and low retardation thickness direction (Rth), and a substrate for a display device and an optical device using the same.

BACKGROUND OF THE INVENTION

The display device market is rapidly changing based on flat panel displays (FPDs) that are easy to fabricate over a large area and can be reduced in thickness and weight. Such flat panel displays include liquid crystal displays (LCDs), organic light emitting displays (OLEDs), or electrophoretic devices (EPDs).

In line with recent efforts to further extend the application and use of flat panel displays, particular attention has focused on so-called flexible display devices in which flexible substrates are applied to flat panel displays. The application of such flexible display devices is particularly reviewed based on mobile devices such as smart phones and the application fields thereof are gradually extended.

Generally, in the production of a flexible display device and a lighting device, a multi-layered inorganic film such as a buffer layer, an active layer, and a gate insulator is formed on a cured polyimide to produce a TFT device.

However, when light is emitted to the polyimide layer (substrate layer), the emission efficiency may be reduced due to the difference between the refractive index of the upper layer of the inorganic multilayered films and the refractive index of the polyimide layer.

Further, the polyimide material contained in the polyimide layer (substrate layer) may cause a decrease in optical properties due to the deterioration of the polyimide at the time of curing at a high temperature of 400° C. or more.

Therefore, there is a need to develop a new polyimide that can satisfy high heat resistance and excellent optical properties.

BRIEF SUMMARY OF THE INVENTION

The present disclosure provides a polyimide-based polymer film that has high heat resistance and can realize excellent optical properties and low thickness direction retardation (Rth).

The present disclosure also provides a substrate for a display device and an optical device comprising the above-mentioned polyimide-based polymer film.

According to one aspect, there is provided a polyimide-based polymer film comprising a polyimide-based polymer containing a polyimide repeating unit represented by the following Chemical Formula 1, wherein a glass transition temperature is 400° C. or more, and a thickness direction retardation value at a thickness of 10 μm is 150 nm or less:

[Chemical Formula 1]

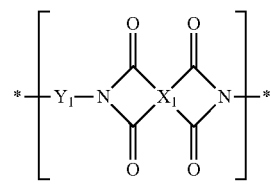

wherein, in Chemical Formula 1, $X_1$ is a tetravalent functional group, and $Y_1$ is an aromatic divalent functional group having 24 or more carbon atoms in which at least one electron-withdrawing functional group is substituted.

According to another aspect, there is provided a substrate for a display device comprising the polyimide-based polymer film.

According to yet another aspect, there is provided an optical device comprising the polyimide-based polymer film.

DETAILED DESCRIPTION OF THE INVENTION

Hereinafter, a polyimide-based polymer film, and a substrate for a display device an optical device comprising the same according to specific embodiments of the present disclosure will be described in more detail.

Unless otherwise specified throughout this specification, the technical terms used herein are only for reference to specific embodiments and is not intended to limit the present disclosure.

The singular forms "a", "an", and "the" used herein include plural references unless the context clearly dictates otherwise.

The term "including" or "comprising" used herein specifies a specific feature, region, integer, step, action, element and/or component, but does not exclude the presence or addition of a different specific feature, region, integer, step, action, element, component and/or group.

The terms including ordinal numbers such as "a first", "a second", etc. are used only for the purpose of distinguishing one component from another component, and are not limited by the ordinal numbers. For instance, a first component may be referred to as a second component, or similarly, the second component may be referred to as the first component, without departing from the scope of the present disclosure.

In the present disclosure, the (co)polymer means including both a polymer and a copolymer, the polymer means a homopolymer consisting of a single repeating unit, and the copolymer means a composite polymer containing two or more repeating units.

In the present disclosure, examples of the substituents are described below, but are not limited thereto.

In the present disclosure, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

In the present disclosure, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

In the present disclosure, the notation

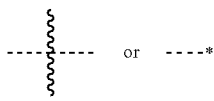

means a bond linked to another substituent group, and a direct bond means the case where no other atoms exist in the parts represented as L.

In the present disclosure, an aromatic is a property that satisfies Huckle's Rule, and a compound can be defined as aromatic if all of the following three conditions are satisfied according to Huckle's Rule.

1) There must be 4n+2 electrons that are completely conjugated by empty p-orbitals, unsaturated bonds, lone electron pairs, etc.

2) 4n+2 electrons have to form planar isomers and form a ring structure.

3) All atoms of the ring have to be able to participate in conjugation.

In the present disclosure, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl and the like, but are not limited thereto. The alkyl group may be substituted or unsubstituted, and when substituted, examples of the substituent are the same as described above.

In the present disclosure, the haloalkyl group means a functional group in which the above-mentioned alkyl group is substituted by a halogen group, and examples of the halogen group are fluorine, chlorine, bromine or iodine. The haloalkyl group may be substituted or unsubstituted, and when substituted, examples of the substituent are the same as described above.

In the present disclosure, a multivalent functional group is a residue in which a plurality of hydrogen atoms bonded to an arbitrary compound are removed, and for example, it may be a divalent functional group, a trivalent functional group, and a tetravalent functional group. As an example, a tetravalent functional group derived from a cyclobutane means a residue in which any four hydrogen atoms bonded to the cyclobutane are removed.

In the present disclosure, the electron-withdrawing group may include one or more selected from the group consisting of a haloalkyl group, a halogen group, a cyano group, a nitro group, a sulfonic acid group, a carbonyl group, and a sulfonyl group, and preferably, it may be a haloalkyl group such as trifluororumethyl group (—$CF_3$).

In the present specification, a direct bond or a single bond means being connected to a bond line in which no atoms or atomic groups exist at the corresponding position. Specifically, it means the case where no other atoms exist in the parts represented as $L_1$, or $L_2$ in Chemical Formula.

In the present specification, the weight average molecular weight means a weight average molecular weight in terms of polystyrene measured by GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement condition are as follows: Waters PL-GPC220 instrument s used and a Polymer Laboratories PLgel MIX-B 300 mm length column was used. An evaluation temperature was 160° C., and 1,2,4-trichlorobenzene was used for a solvent at a flow rate of 1 mL/min. Samples were prepared at a concentration of 10 mg/10 mL and then supplied in an amount of 200 µL, and the values of Mw could be determined using a calibration curve formed using a polystyrene standard. 9 kinds of the polystyrene standards were used with the molecular weight of 2,000/10,000/30,000/70,000/200,000/700,000/2,000,000/4,000,000/10,000,000.

Below, the present disclosure will be described in more detail.

1. Polyimide-Based Polymer Film

According to one embodiment of the present disclosure, there can be provided a polyimide-based polymer film comprising a polyimide-based polymer containing a polyimide repeating unit represented by the Chemical Formula 1, wherein a glass transition temperature is 400° C. or more, and a thickness direction retardation value at a thickness of 10 µm is 150 nm or less.

The present inventors have found through experiments that when the features, in which the glass transition temperature is 400° C. or more and the thickness direction retardation value at a thickness of 10 µm is 150 nm or less, are satisfied as in the polyimide-based polymer film of the one embodiment, even the polyimide polymer film cured at a high temperature of 400° C. or more exhibits colorless and transparent optical properties and low thickness direction retardation (Rth) properties, whereby optical isotropy is increased, the diagonal view angle of a display to which the polyimide polymer film is applied is secured, and thus excellent visibility can be realized. The present disclosure has been completed on the basis of such findings.

In particular, since the polyimide-based polymer has a structure in which in the polyimide repeating unit represented by Chemical Formula 1, the diamine-derived $Y_1$ functional group contains a functional group having increased aromaticity compared to a conventional case, such as an aromatic divalent functional group having 24 or more carbon atoms in which at least one electron-withdrawing functional group is substituted, so that the ordering and orientation characteristics between polyimide molecules are improved and sufficient heat resistance is ensured even in the polyimide film obtained by high-temperature curing, whereby when used as a plastic substrate, the plastic substrate is prevented from being damaged by heat when heat-treating the metal layer formed on the plastic substrate, and excellent thermal stability can be realized without thermal decomposition even when applied to an organic light emitting diode (OLED) device using a low temperature polysilane (LTPS) process close to 500° C.

In addition, since the polyimide-based polymer has a structure in which in the polyimide repeating unit represented by Chemical Formula 1, the diamine-derived $Y_1$ functional group contains a functional group having increased aromaticity compared to a conventional case, such as an aromatic divalent functional group having 24 or more carbon atoms in which at least one electron-withdrawing functional group is substituted, the difference between the average value of the plane refractive index values and the refractive index in the thickness direction decreases, thereby capable of realizing low thickness direction retardation (Rth).

Further, an electron-withdrawing functional group such as a trifluoromethyl group ($-CF_3$), which can impart an electron withdrawing effect, is introduced as a substituent into the diamine monomer compound used for the synthesis of the polyimide polymer, so that it suppresses the formation of a charge transfer complex (CTC) of Pi-electrons existing in the imide chain, thereby securing transparency and realizing excellent optical properties.

Specifically, the polyimide film according to the present disclosure can increase the refractive index, and is used as a substrate layer in a flexible display device, which can reduce the difference in refractive index with each layer constituting the device, thereby reducing the amount of light that is dissipated inside, and effectively increasing bottom emission efficiency.

The polyimide-based polymer may include polyimide. The polyimide-based polymer may include both polyamic acid and polyamic acid ester, which are precursor polymers thereof, in addition to polyimide.

The polyimide-based polymer refers to including not only polyimide but also polyamic acid and polyamic acid ester which are precursor polymers thereof. That is, the polyimide-based polymer may include at least one selected from the group consisting of a polyamic acid repeating unit, a polyamic acid ester repeating unit, and a polyimide repeating unit. That is, the polyimide-based polymer may include one type of polyamic acid repeating unit, one type of polyamic acid ester repeating unit, one type of polyimide repeating unit, or a copolymer in which two type or more of these repeating units are mixed.

At least one repeating unit selected from the group consisting of the polyamic acid repeating unit, the polyamic acid ester repeating unit, and the polyimide repeating unit can form the backbone of the polyimide-based polymer.

In particular, the polyimide-based polymer may include a polyimide repeating unit represented by Chemical Formula 1.

In Chemical Formula 1, $X_1$ is an arbitrary tetravalent functional group, and the $X_1$ is a functional group derived from a tetracarboxylic dianhydride compound used in the synthesis of a polyimide-based polymer.

Specifically, the tetravalent functional group of the $X_1$ may include an aromatic tetravalent functional group containing a polycyclic ring. When the aromatic tetravalent functional group containing a polycyclic ring is included in the $X_1$, a structure having increased steric hindrance by a polycyclic ring is introduced into the polyimide chain structure, which increases the orientation in the thickness direction to induce isotropy and exhibits thickness direction retardation (Rth) properties, secures a diagonal view angle of a display, realizes excellent visibility, improves heat resistance by alleviating deformation caused by heat, and alleviates the shrinkage of the film that occurs during the cooling process after the heating process.

More specifically, the tetravalent functional group of the $X_1$ may include a functional group represented by the following Chemical Formula 3.

[Chemical Formula 3]

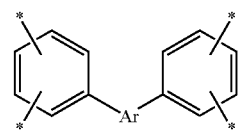

wherein, in Chemical Formula 3, Ar is a polycyclic aromatic divalent functional group. The polycyclic aromatic divalent functional group is a divalent functional group derived from a polycyclic aromatic hydrocarbon compound or a derivative compound thereof, and may include a fluorenylene group. The derivative compound includes all compounds in which one or more substituents are introduced or carbon atoms are replaced with heteroatoms.

More specifically, in Ar of Chemical Formula 3, the polycyclic aromatic divalent functional group may include a fused cyclic divalent functional group containing at least two or more aromatic ring compounds. That is, the polycyclic aromatic divalent functional group not only contains at least two or more aromatic ring compounds in the functional group structure, but also can have a fused ring structure.

The aromatic ring compound may include an arene compound containing at least one benzene ring, or a hetero arene compound in which a carbon atom in the arene compound is replaced with a heteroatom.

At least two or more of the aromatic ring compound can be contained within the polycyclic aromatic divalent functional group, and each of the two or more aromatic ring compounds may directly form a fused ring or may form a fused ring via another ring structure. In one example, when two benzene rings are each fused to a cycloalkyl ring structure, it can be defined that two benzene rings form a fused ring via a cycloalkyl ring.

The fused cyclic divalent functional group containing at least two or more aromatic ring compounds is a divalent functional group derived from a fused cyclic compound containing at least two or more aromatic ring compounds or a derivative compound thereof, and the derivative compound includes all compounds in which one or more substituents are introduced or carbon atoms are replaced with heteroatoms.

Examples of the polycyclic aromatic divalent functional group are not particularly limited, but as an example, the tetravalent functional group represented by Chemical Formula 3 may include a functional group represented by the following Chemical Formula 3-1.

[Chemical Formula 3-1]

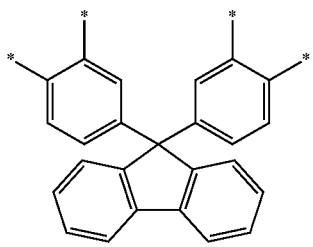

Meanwhile, in Chemical Formula 1, $Y_1$ is an aromatic divalent functional group having 24 or more carbon atoms, or 24 or more and 30 or less carbon atoms, or 24 or more and 28 or less carbon atoms, in which at least one electron-withdrawing functional group is substituted, and the $Y_1$ may be a functional group derived from a polyamic acid, a polyamic acid ester, or a diamine compound used in the synthesis of polyimide.

In the $Y_1$, the aromatic divalent functional group having 24 or more carbon atoms may include four or more aromatic ring compounds. As the four or more aromatic ring compounds are contained in this way, the CTC (charge transfer complex) effect between polymer chains is strengthened, the refractive index in the plane direction is increased, and anisotropy is induced. The polyimide-based polymer has improved intermolecular ordering and orientation characteristics, so that sufficient heat resistance and process efficiency can be secured even in a polyimide film obtained by high-temperature curing.

When the carbon number of the aromatic divalent functional group in the $Y_1$ is reduced to less than 24, aromaticity decreases while the number of aromatic ring compounds decreases to 3 or less, whereby the charge transfer complex (CTC) effect between polymer chains and the ordering and orientation characteristics between polyimide molecules becomes relatively weak, which causes a problem that heat resistance and process efficiency in the polyimide film obtained by high-temperature curing is remarkably poor.

The aromatic divalent functional group having 24 or more carbon atoms may include at least one selected from the group consisting of a quarterphenylene group and a pentaphenylene group. Specifically, the aromatic divalent functional group having 24 or more carbon atoms may be derived from an aromatic compound having a maximum light absorption wavelength of 280 nm or more and 300 nm or less.

For example, in the case of a biphenylene group having 12 carbon atoms, the maximum light absorption wavelength is 247 nm, and in the case of a terphenylene group having 18 carbon atoms, the maximum light absorption wavelength is 274 nm, whereas in the case of a quaterphenylene group having 24 carbon atoms, the maximum light absorption wavelength may be 292 nm.

The maximum light absorption wavelength can be measured using a $CH_2Cl_2$ solvent, and applying a conventionally known light absorption wavelength measuring method and apparatus without limitation.

The electron-withdrawing functional group may include at least one selected from the group consisting of a haloalkyl group, a halogen group, a cyano group, a nitro group, a sulfonic acid group, a carbonyl group, and a sulfonyl group.

As electron-withdrawing substituents such as trifluoromethyl group ($-CF_3$) having a high electronegativity are substituted, the effect of inhibiting the formation of charge transfer complex (CTC) of Pi-electrons present in the polyimide polymer chain is increased, thereby securing improved transparency. That is, the packing within the polyimide structure or between chains can be reduced, and the steric hindrance and electrical effects can weaken the electrical interaction between the chromogenic sources, and thus exhibit high transparency in the visible light region.

Specifically, in the $Y_1$, the aromatic divalent functional group having 24 or more carbon atoms in which at least one electron-withdrawing functional group is substituted may include a functional group represented by the following Chemical Formula 2.

[Chemical Formula 2]

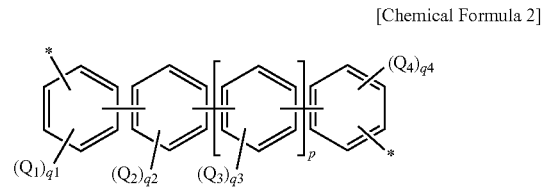

wherein, in Chemical Formula 2, $Q_1$ to $Q_4$ are the same as or different from each other, and are each independently an electron-withdrawing functional group, q1 to q4 are the same as or different from each other, and are each independently an integer of 0 to 4, and p is an integer of 1 to 10, or 1 to 3.

More specifically, in Chemical Formula 1, $Y_1$ may be substituted with 1 or more, or 3 or less, or 1 to 3, or 1 to 2 electron-withdrawing functional groups.

Specifically, the aromatic divalent functional group having 24 or more carbon atoms of the $Y_1$ in which at least one electron-withdrawing functional group is substituted may include a functional group represented by the following Chemical Formula 2-1.

[Chemical Formula 2-1]

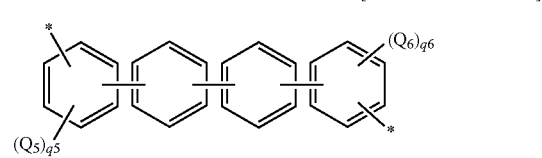

wherein, in Chemical Formula 2-1, $Q_5$ and $Q_6$ are the same as or different from each other, and are each independently an electron-withdrawing functional group, q5 to q6 are the same as or different from each other, and are each independently an integer of 0 or 1, and (q5+q6) is an integer of 1 or 2.

In Chemical Formula 1, when the number of the electron-withdrawing functional group in the $Y_1$ is excessively increased to more than 2 or more than 3, the structure of the polyimide repeating unit represented by Chemical Formula 1 becomes relatively bulky, and the electron density becomes insufficient due to the excessive introduction of electron-withdrawing functional groups, which causes a technical problem that thermal properties (Tg, CTE) is deteriorated.

For example, in the $Y_1$, the aromatic divalent functional group having 24 or more carbon atoms in which at least one electron-withdrawing functional group is substituted may include a functional group represented by the following Chemical Formula 2-2.

[Chemical Formula 2-2]

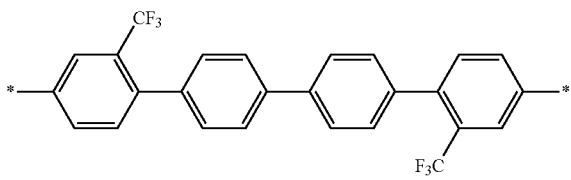

The polyimide-based polymer may include a combination of a tetracarboxylic dianhydride represented by the following Chemical Formula 4 and an aromatic diamine having 24 or more carbon atoms in which at least one electron-withdrawing functional group is substituted.

[Chemical Formula 4]

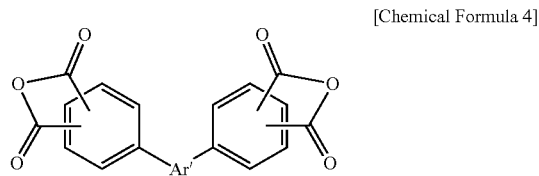

wherein, in Chemical Formula 4, Ar' is a polycyclic aromatic divalent functional group. The polycyclic aromatic divalent functional group is a divalent functional group derived from a polycyclic aromatic hydrocarbon compound, and is a divalent functional group derived from a fluorenylene group or a derivative compound thereof, and may include a fluorenylene group. The derivative compound includes all compounds in which one or more substituents are introduced or carbon atoms are replaced with heteroatoms.

Specific examples of the tetracarboxylic dianhydride represented by Chemical Formula 4 may include 9,9-bis(3,4-dicarboxyphenyl)fluorene dianhydride (BPAF).

The aromatic diamine having 24 or more carbon atoms in which at least one electron-withdrawing functional group is substituted is a compound in which an amino group (—NH$_2$) is bonded to both terminals of the aromatic divalent functional group having 24 or more carbon atoms in which at least one electron-withdrawing functional group is substituted, and the details concerning the aromatic divalent functional group having 24 or more carbon atoms in which at least one electron-withdrawing functional group is substituted is the same as those described above.

Specific examples of the aromatic diamine having 24 or more carbon atoms in which at least one electron-withdrawing functional group is substituted may include a diamine represented by the following Chemical Formula a.

[Chemcial Formula a]

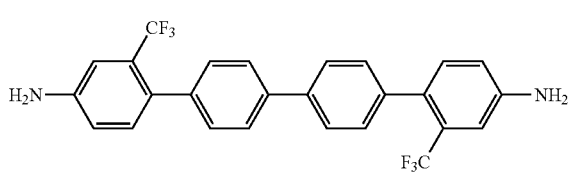

The diamine represented by Chemical Formula a may be contained in an amount of 95 mol % or more, or 96 mol % or more, or 97 mol % or more, or 98 mol % or more, or 99 mol % or more, or 100 mol % or less, or 95 mol % to 100 mol %, or 96 mol % to 100 mol %, or 97 mol % to 100 mol %, or 98 mol % to 100 mol %, or 99 mol % to 100 mol % based on the total diamine.

More specifically, in the polyimide-based polymer, a bond between the nitrogen atom of the amino group and the carbon atom of the anhydride group can be formed by a reaction between a terminal anhydride group (—OC—O—CO—) of the tetracarboxylic dianhydride represented by Chemical Formula 4 and the terminal amino group (—NH$_2$) of an aromatic diamine having 24 or more carbon atoms in which at least one electron-withdrawing functional group is substituted.

Further, the polyimide-based polymer may further include a polyimide repeating unit represented by the following Chemical Formula 5 in addition to the polyimide repeating unit represented by Chemical Formula 1 above.

[Chemical Formula 5]

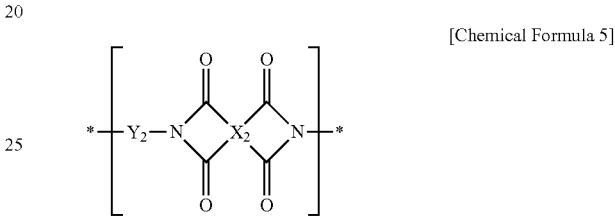

wherein, in Chemical Formula 5, $X_2$ is a tetravalent functional group different from that of $X_1$, and $Y_2$ is an aromatic divalent functional group having 24 or more carbon atoms in which at least one electron-withdrawing functional group is substituted.

The $X_2$ may be one of the tetravalent functional groups represented by Chemical Formula 6.

[Chemical Formula 6]

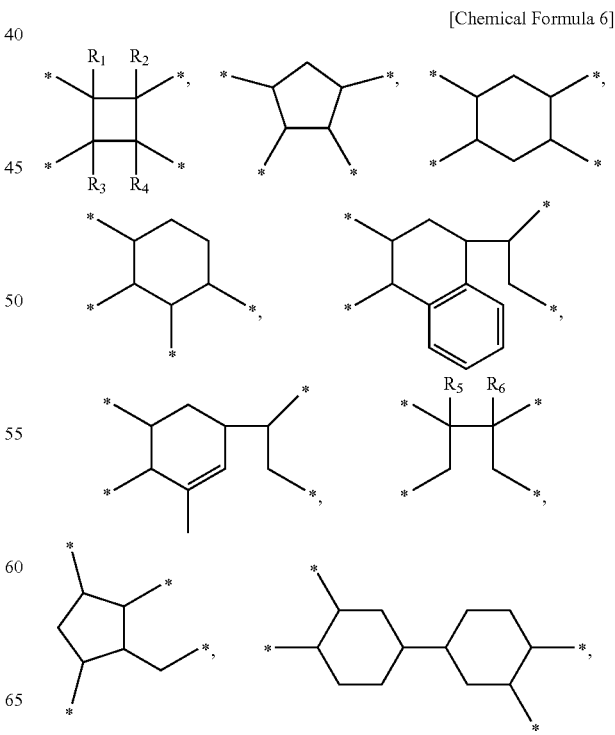

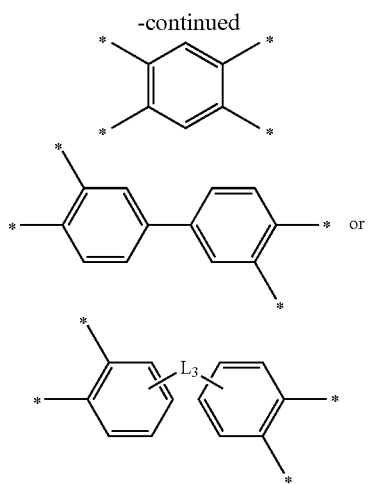

wherein, in Chemical Formula 6, $R_1$ to $R_6$ are each independently hydrogen or an alkyl group having 1 to 6 carbon atoms, $L_3$ is any one selected from the group consisting of a single bond, —O—, —CO—, —COO—, —S—, —SO—, —SO$_2$—, —CR$_7$R$_8$—, —O(CH$_2$)$_t$O—, —COO(CH$_2$)$_t$OCO—, —CONH—, phenylene or a combination thereof, where $R_7$ and $R_8$ are each independently one of hydrogen, an alkyl group having 1 to 10 carbon atoms, or a halo alkyl group having 1 to 10 carbon atoms, and t is an integer of 1 to 10.

Specific examples of the functional group represented by Chemical Formula 6 may include a functional group represented by the following Chemical Formula 6-1, or a functional group represented by the following Chemical Formula 6-2, or a functional group represented by the following Chemical Formula 6-3.

[Chemical Formula 6-1]

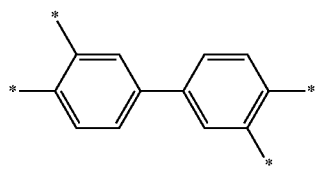

[Chemical Formula 6-2]

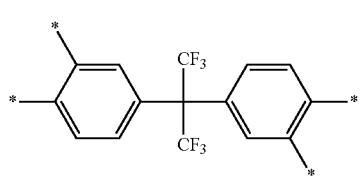

[Chemical Formula 6-3]

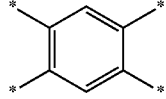

That is, the polyimide may include a first repeating unit containing a repeating unit represented by Chemical Formula 1 in which the repeating unit derived from tetracarboxylic dianhydride is the functional group represented by Chemical Formula 3; and a second repeating unit containing a repeating unit represented by Chemical Formula 5 in which the repeating unit derived from tetracarboxylic dianhydride is the functional group represented by Chemical Formula 6. The first repeating unit and the second repeating unit are randomly arranged in the polyimide polymer to form a random copolymer, or a block copolymer can be formed by forming a block between the first repeating units and a block between the second repeating units.

The polyimide-based polymer including the repeating unit represented by Chemical Formula 1 and the repeating unit represented by Chemical Formula 5 can be prepared by reacting two or more different types of tetracarboxylic dianhydride compounds with a diamine compound, and a random copolymer can be synthesized by simultaneously adding the two types of tetracarboxylic dianhydrides, or a block copolymer can be synthesized by sequentially adding them.

The polyimide repeating unit represented by Chemical Formula 5 may be contained in an amount of 1 mol % or more and 99 mol % or less with respect to the total repeating units contained in the polyimide-based polymer.

The polyimide repeating unit represented by Chemical Formula 1 and the polyimide repeating unit represented by Chemical Formula 5 may be contained in an amount of 95 mol % or more, or 96 mol % or more, or 97 mol % or more, or 98 mol % or more, or 99 mol % or more, or 100 mol % or less, or 95 mol % to 100 mol %, or 96 mol % to 100 mol %, or 97 mol % to 100 mol %, or 98 mol % to 100 mol %, or 99 mol % to 100 mol % with respect to the total repeating units contained in the polyimide-based polymer.

That is, the polyimide-based polymer is composed of only the polyimide repeating unit represented by Chemical Formula 1 and the polyimide repeating unit represented by Chemical Formula 5, or most of them may be composed of the polyimide repeating unit represented by Chemical Formula 1 and the polyimide repeating unit represented by Chemical Formula 5.

When the polyimide repeating unit represented by Chemical Formula 1 and the polyimide repeating unit represented by Chemical Formula 5 are contained in an amount of less than 95 mol % with respect to the total repeating units contained in the polyimide-based polymer, as the content of the polyimide repeating unit represented by Chemical Formula 1 and the polyimide repeating unit represented by Chemical Formula 5 derived from the diamine structure having relatively high linearity is reduced, and the content of the polyimide repeating unit derived from other diamine structures with relatively low linearity is increased, there may be technical problems that heat resistance (Tg, CTE) is reduced.

More specifically, the polyimide-based polymer is not mixed with other diamines in addition to the diamine capable of inducing an aromatic divalent functional group having 24 or more carbon atoms substituted with at least one electron withdrawing functional group, or may be mixed in a small amount of less than 1 mol %.

The weight average molecular weight (measured by GPC) of the polyimide-based polymer is not particularly limited, but for example, it may be 1000 g/mol or more and 200000 g/mol or less, or 10000 g/mol or more and 200000 g/mol or less.

The polyimide-based polymer according to the present disclosure can exhibit excellent colorless and transparent properties while maintaining the properties such as heat resistance and mechanical strength due to a rigid structure as they are, and thus can be used in various fields such as a substrate for device, a cover substrate for display, an optical film, IC (integrated circuit) package, an adhesive film, a multi-layer flexible printed circuit (FRC), a tape, a touch panel, a protective film for optical disk, and the like, and particularly, it may be suitable for a cover substrate for display.

Meanwhile, the polyimide-based polymer film of the one embodiment may include a cured product in which the polyimide-based polymer is cured at a temperature of 400° C. or more. The cured product means a material obtained through a curing process of the polymer composition containing the polyimide-based polymer, and the curing process may be performed at a temperature of 400° C. or more, or 400° C. or more and 500° C. or less.

More specifically, examples of the method for synthesizing the polyimide-based polymer are not particularly limited, and for example, a method of producing a film including a step of coating a polymer composition containing the polyimide-based polymer onto a substrate to form a coating film (step 1); a step of drying the coating film (step 2); and a step of heat-treating and curing the dried coating film (step 3) can be used.

Step 1 is a step of coating the polymer composition containing the above polyimide-based polymer onto a substrate to form a coating film. The method of coating the polymer composition containing the polyimide-based polymer onto a substrate is not particularly limited, and for example, a method such as screen printing, offset printing, flexographic printing, inkjet, and the like can be used.

Further, the polymer composition containing the polyimide-based polymer may be in the form that is dissolved or dispersed in an organic solvent. In the case of having such form, for example, when the polyimide-based polymer is synthesized in the organic solvent, the solution may be the reaction solution thus obtained itself or may be a solution obtained by diluting the reaction solution with another solvent. Further, when the polyimide-based polymer is obtained as powder, the solution may be a solution obtained by dissolving the powder in an organic solvent.

Specific examples of the organic solvent include toluene, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

The polymer composition containing the polyimide-based polymer may contain a solid content in an amount so as to have an appropriate viscosity in consideration of processability such as applicability during the film forming process. For example, the content of the composition may be adjusted so that the content of the total polymer is 5% by weight or more and 25% by weight or less, or alternatively, it can be adjusted to 5% by weight or more and 20% h weight or less, or 5% by weight or more and 15% by weight or less.

Further, the polymer composition containing the polyimide-based polymer may further include other components in addition to the organic solvent. As a non-limiting example, when the polymer composition containing the polyimide-based polymer s applied, art additive capable of improving film thickness uniformity or surface smoothness, improving adhesion to a substrate, changing dielectric constant or conductivity, or increasing denseness may be further included. Examples of such additives include a surfactant, a silane-based compound, a dielectric or a crosslinkable compound, and the like.

Step 2 is a step of drying the coating film formed by coating a polymer composition containing the polyimide-based polymer onto a substrate.

The step of drying the coating film can be performed by a heating means such as a hot plate, a hot-air circulation furnace, an infrared furnace and the like, and the drying can be performed at a temperature of 50° C. or more and 150° C. or less, or 50° C. or more and 100° C. or less.

Step 3 is a step of heat-treating and curing the dried coating film. In this case, the heat treatment can be performed by a heating means such as a hot plate, a hot-air circulation furnace, an infrared furnace and the like, and the heat treatment can be performed at a temperature of 400° C. or more, or 400° C. or more and 500° C. or less.

The thickness of the polyimide-based polymer film is not particularly limited, but for eye it can be freely adjusted within the range of 0.01 μm or more and 1000 μm or less. If the thickness of the polyimide-based polymer increases or decreases by a specific value, the physical properties measured in the polyimide-based polymer film may also change by a certain value.

The polyimide-based polymer film may have a thickness direction retardation value at a thickness of 10 μm of 150 nm or less, 0.1 nm or more and 150 nm or less, or 10 nm or more and 150 nm or less. The optical isotropy is increased through the low thickness direction retardation (Rth) characteristic, thereby capable of securing a diagonal view angle of a display to which the polyimide-based polymer film is applied, and realizing excellent visibility.

Further, when a transparent display is implemented, the distortion phenomenon is relatively reduced when light is transmitted in the structure in which the polyimide exists on the upper part, thereby capable of securing the process efficiency and economic efficiency in which it is not necessary to additional use a compensation film for correcting the refraction of transmitted light.

The retardation in the thickness direction may be measured for a wavelength of 550 nm, and examples of the measuring method and equipment are not particularly limited, and various methods conventionally used for measuring the thickness direction retardation can be applied without limitation.

Specifically, the thickness direction retardation Rth may be calculated according to the following Equation.

$$R_{th}(nm) = |[(n_x + n_y)/2] - n_z| \times d$$

(wherein, $n_x$ is the largest refractive index among the in-plane refractive indexes of the polyimide polymer film measured with light having a wavelength of 550 nm; $n_y$ is the refractive index perpendicular to nx among the in-plane refractive indexes of the polyimide polymer film measured with light having a wavelength of 550 nm; $n_z$ is the refractive index in the thickness direction of the polyimide polymer film measured with light having a wavelength of 550 nm; and d is the thickness of the polyimide film.)

That is, the thickness direction retardation Rth is a value obtained by multiplying the film thickness by the absolute value of the difference between the thickness direction refractive index value (nz) and the average value $[(n_x+n_y)/2]$ of the plane refractive index values. As the difference between the thickness direction refractive index value ($n_z$) and the average value $[(n_x+n_y)/2]$ of the plane refractive index values is smaller, the value may be lower.

As the polyimide-based polymer film satisfies 150 nm or less of the thickness direction retardation value at a thickness of 10 μm, the difference between the thickness direction refractive index value ($n_z$) and the average value of the plane refractive index value $[(n_x+n_y)/2]$ on the display to which the polyimide-based polymer film is applied is reduced, thereby capable of realizing excellent visibility.

When the thickness direction retardation value at the thickness of 10 μm of the polyimide-based polymer film is excessively increased to more than 150 nm, at the time of implementing a transparent display, a distortion phenomenon occurs when light is transmitted in a structure in which polyimide exists on the upper part. In order to correct the refraction of transmitted light, the process efficiency and economic efficiency of having to use an additional compensation film can be reduced.

Meanwhile, the polyimide-based polymer film may have a glass transition temperature of 400° C. or more, or 400° C. or more and 500° C. or less. Therefore, even when applied to an organic light emitting diode (OLED) device using a low temperature polysilane (LTPS) process close to 500° C., excellent thermal stability may be realized without thermal decomposition.

Further, as the polyimide-based polymer film has a glass transition temperature at a temperature of 400° C. or more, or 400° C. or more and 500° C. or less, sufficient heat resistance can be secured even with the polyimide film obtained by high-temperature curing. When this is used as a plastic substrate, it is possible to prevent the plastic substrate from being damaged by heat when the metal layer formed on the plastic substrate is heat-treated.

Examples of the method for measuring the glass transition temperature are not particularly limited. For example, using a thermomechanical analyzer (TMA (Q400 by TA Instruments)), the pulling force of the film is set to 0.02 N, the primary temperature-raising process is performed at a heating rate of 5° C./min in a temperature range of 100 to 350° C., and then the cooling was performed at a rate of 4° C./min in a temperature range of 350 to 100° C., a second temperature-raising process is performed in a temperature range of 100 to 450° C. at a heating rate of 5° C./min, and the inflection point seen in the heating section at the temperature-raising process can be obtained as Tg.

When the glass transition temperature of the polyimide-based polymer film is excessively reduced to less than 400° C., the heat resistance is insufficient and the dimensional stability is insufficient, and therefore, there is a limit that the TFT process cannot be withstood.

Specifically, the polyimide-based polymer film may have a haze value of 1.5% or less, or 0.1% or more and 1.5% or less. Further, the polyimide-based polymer film may have a yellowness index value of 15 or less, or 1 or more and 15 or less.

The haze may be measured from the polyimide film sample having a thickness of 10±2 μm. When the thickness of the polyimide film increases or decreases by a specific value, the physical properties measured from the polyimide film may also vary by a certain value.

Further, the polyimide-based polymer film may have an average transmittance of 60% or more, or 60% or more and 99% or less in a wavelength band of 380 nm or more and 780 nm or less. The transmittance can be measured from the polyimide film sample having a thickness of 10±2 μm. When the thickness of the polyimide film increases or decreases by a specific value, the physical properties measured from the polyimide film may also vary by a certain value.

2. Substrate for Display Device

Meanwhile, according to another embodiment of the present disclosure, there can be provided a substrate for a display device including the polyimide-based polymer film of the other embodiments. The details concerning the polyimide-based polymer film may include all the contents described above in the one embodiment.

A display device including the substrate may include a liquid crystal display device (LCD), an organic light emitting diode (OLED), a flexible display, or a rollable display or foldable display, and the like, but is not limited thereto.

The display device may have various structures depending on the field of application, a specific shape, and the like. For example, it may have a structure including a cover plastic window, a touch panel, a polarizing plate, a barrier film, a light emitting device (OLED device, or the like), a transparent substrate, and the like.

The polyimide-based polymer film of another embodiment described above may be used in various applications such as a substrate, an external protection layer, or a cover window in these various display devices, and more specifically, it may be applied as a substrate.

For example, the substrate for the display device may have a structure in which a device protection layer, a transparent electrode layer, a silicon oxide layer, a polyimide-based polymer film, a silicon oxide layer, and a hard coating layer are sequentially stacked.

The transparent polyimide substrate may include a silicon oxide layer formed between the transparent polyimide-based polymer film and the cured layer in terms of improving solvent resistance, moisture permeability and optical properties, and the silicon oxide layer may be produced by curing polysilazane.

Specifically, before the step of forming a coating layer on at least one surface of the transparent polyimide polymer film, the silicon oxide layer can be formed by coating and drying a solution containing polysilazane, and then curing the coated polysilazane.

The substrate for a display device according to the present disclosure comprises the above-mentioned device protection layer, thereby capable of providing a transparent polyimide cover substrate having excellent warpage characteristics and impact resistance, solvent resistance, optical properties, moisture permeability and scratch resistance.

3. Optical Device

Meanwhile, according to yet another embodiment of the present disclosure, there can be provided an optical device including the polyimide-based polymer film of the other embodiments. The details concerning the polyimide-based polymer film may include all the contents described above in the one embodiment.

The optical device may include all kinds of devices that utilize the properties realized by light, and for example, a display device may be mentioned. Specific examples of the display device include a liquid crystal display device (LCD), an organic light emitting diode (OLED), a flexible display, or a rollable display or foldable display, and the like, but is not limited thereto.

The optical device may have various structures depending on the field of application, a specific shape, and the like. For example, it may have a structure including a cover plastic window, a touch panel, a polarizing plate, a barrier film, a light emitting device (OLED device, or the like), a transparent substrate, and the like.

The polyimide-based polymer film of another embodiment described above can be used in various applications such as a substrate, an external protective film or a cover window in these various optical devices, and more specifically, it can be applied to a substrate.

Advantageous Effects

According to the present disclosure, a polyimide-based polymer film that has high heat resistance and can realize excellent optical characteristics and low thickness direction retardation (Rth), and a substrate for a display device and an optical device using the same can be provided.

DETAILED DESCRIPTION OF THE EMBODIMENTS

The present disclosure will be described in more detail by way of examples. However, the following examples are for illustrative purposes only, and the content of the present disclosure is not limited to these examples.

Example: Production of Polyimide Film

Example 1

(1) Preparation of Polyimide Precursor Composition

The organic solvent DEAc was filled in a reactor under nitrogen stream, and then while maintaining the temperature of the reactor to 25° C., 0.735 mol of a diamine represented by the following Chemical Formula a was added and dissolved at the same temperature. To the solution to which the diamine represented by Chemical Formula a was added, 0.3675 mol of 9,9-bis(3,4-dicarboxyphenyl)fluorene dianhydride (BPAF) represented by the following Chemical Formula b and 0.3675 mol of 3,3',4,4'-biphenyltetracarboxylic dianhydride (BPDA) were added as an acid dianhydride at the same temperature, and the mixture was stirred for 24 hours to obtain a polyimide precursor composition.

[Chemical Formula a]

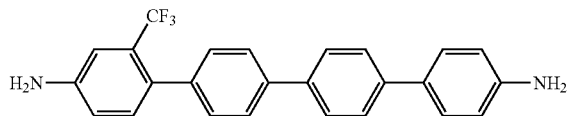

[Chemical Formula b]

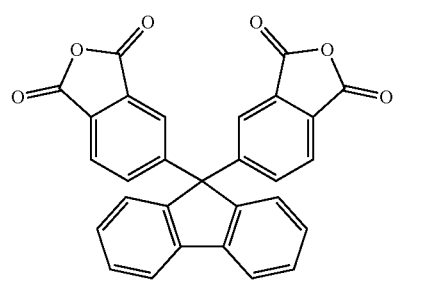

(2) Production of Polyimide Film

The polyimide precursor composition was spin-coated onto a glass substrate. The glass substrate coated with the polyimide precursor composition was placed in an oven and heated at a rate of 5° C./min, and the curing process was carried out by holding at 80° C. for 30 minutes and at 400° C. for 30 minutes. After completion of the curing process, the glass substrate was immersed in water, the film formed on the glass substrate was removed and dried in an oven at 100° C. to produce a polyimide film having a thickness of 10 μm.

Example 2

A polyimide film was produced in the same manner as in Example 1, except that 4,4'-(hexafluoroisopropylidene) diphthalic anhydride (6-FDA) was used as the acid dianhydride instead of 3,3',4,4'-biphenyltetracarboxylic dianhydride (BPDA).

Example 3

A polyimide film was produced in the same manner as in Example 1, except that pyromellitic dianhydride (PMDA) was used as the acid dianhydride instead of 3,3',4,4'-biphenyltetracarboxylic dianhydride (BPDA).

Comparative Example: Production of Polyimide Film

Comparative Example 1

A polyimide film was produced in the same manner as in Example 1, except that p-phenylenediamine (p-PDA) was used as the diamine instead of the diamine represented by Chemical Formula a.

Comparative Example 2

A polyimide film was produced in the same manner as in Example 1, except that 2,2'-bis(trifluoromethyl)benzidine (TFMB) represented by the following Chemical Formula c was used as the diamine instead of the diamine represented by Chemical Formula a.

[Chemical Formula c]

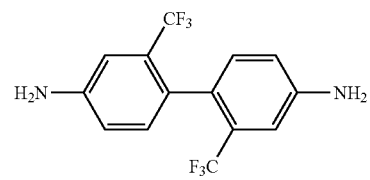

Comparative Example 3

A polyimide film was produced in the same manner as in Example 1, except that 4,4'-DDS (4,4'-diaminodiphenyl sulfone) represented by the following Chemical Formula d was used as the diamine instead of the diamine represented by Chemical Formula a.

[Chemical Formula d]

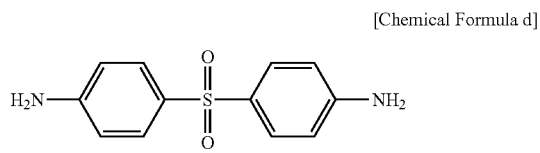

Comparative Example 4

(1) Preparation of Polyimide Precursor Composition

The organic solvent DEAc was filled in a reactor under nitrogen stream, and then while maintaining the temperature of the reactor to 25° C., 0.735 mol of a diamine represented by the following Chemical Formula e was added and dissolved at the same temperature. To the solution to which the diamine represented by Chemical Formula e was added, 0.3675 mol of 9,9-bis(3,4-dicarboxyphenyl)fluorene dianhydride (BPAF) represented by the following Chemical Formula 2 and 0.3675 mol of 3,3',4,4'-biphenyltetracarboxylic dianhydride (BPDA) were added as an acid dianhydride at the same temperature, and the mixture was stirred for 24 hours to obtain a polyimide precursor composition.

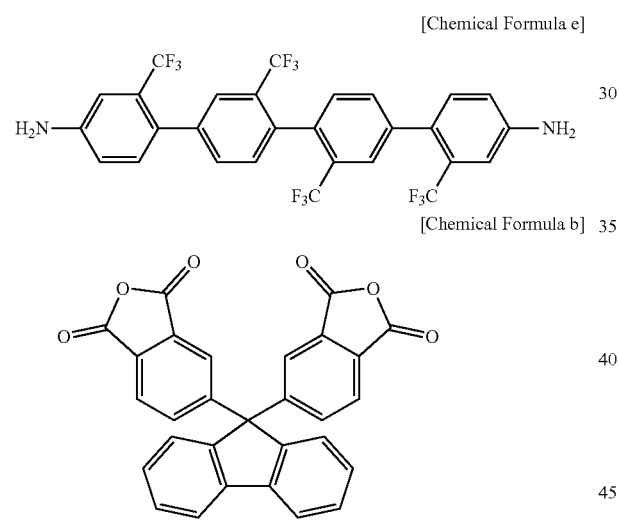

[Chemical Formula e]

[Chemical Formula b]

(2) Production of Polyimide Film

The polyimide precursor composition was spin-coated onto a glass substrate. The glass substrate coated with the polyimide precursor composition was placed in an oven and heated at a rate of 5° C./min, and the curing process was carried out by holding at 80° C. for 30 minutes and at 400° C. for 30 minutes. After completion of the curing process, the glass substrate was immersed in water, the film formed on the glass substrate was removed and dried in an oven at 100° C. to produce a polyimide film having a thickness of 10 μm.

Comparative Example 5

(1) Preparation of Polyimide Precursor Composition

The organic solvent DEAc was filled in a reactor under nitrogen stream, and then while maintaining the temperature of the reactor to 25° C., 0.6615 mol of a diamine represented by the following Chemical Formula a and 0.0735 mol of 4,4'-DDS (4,4'-diaminodiphenyl sulfone) represented by the following Chemical Formula d were added and dissolved at the same temperature. To the solution to which 0.6615 mol of a diamine represented by Chemical Formula a and 0.0735 mol of 4,4'-DDS (4,4'-diaminodiphenyl sulfone) represented by Chemical Formula d were added, 0.3675 mol of 9,9-bis(3,4-dicarboxyphenyl)fluorene dianhydride (BPAF) represented by the following Chemical Formula b and 0.3675 mol of 3,3',4,4'-biphenyltetracarboxylic dianhydride (BPDA) were added as an acid dianhydride at the same temperature, and the mixture was stirred for 24 hours to obtain a polyimide precursor composition.

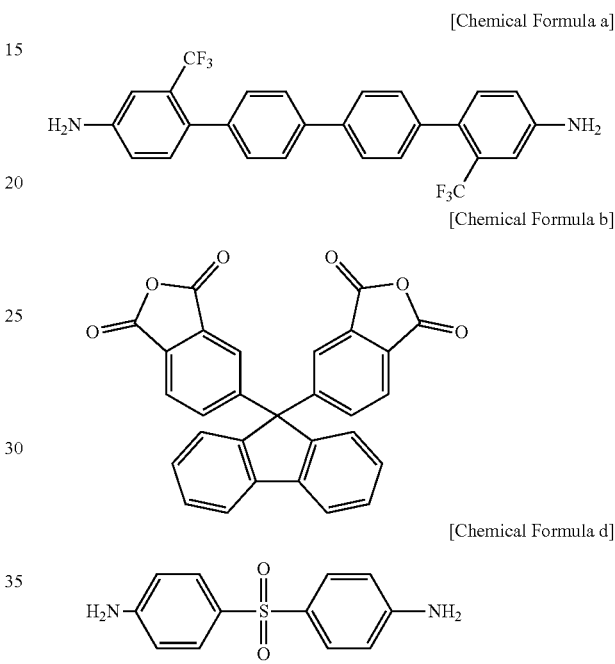

[Chemical Formula a]

[Chemical Formula b]

[Chemical Formula d]

(2) Production of Polyimide Film

The polyimide precursor composition was spin-coated onto a glass substrate. The glass substrate coated with the polyimide precursor composition was placed in an oven and heated at a rate of 5° C./min, and the curing process was carried out by holding at 80° C. for 30 minutes and at 400° C. for 30 minutes. After completion of the curing process, the glass substrate was immersed in water, the film formed on the glass substrate was removed and dried in an oven at 100° C. to produce a polyimide film having a thickness of 10 μm.

Experimental Example: Measurement of Physical Properties of Polyimide Films Obtained in Examples and Comparative Examples The physical properties of the polyimide films obtained in Examples and Comparative Examples were measured by the following method, and the results are shown in Table 1 below.

1. Thickness Direction Retardation (Rth)

Using the product name "AxoScan" produced by AXOMETRICS as a measuring device, the refractive index values of the polyimide films produced in Examples and Comparative Examples with respect to light at 550 nm were inputted, and the thickness direction retardation was measured using light having a wavelength of 550 nm under conditions of temperature: 25° C. and humidity: 40%. Then, the retardation was obtained by converting the obtained retardation measurement value in the thickness direction (measurement value by automatic measurement of the measuring device) into a retardation value per 10 μm of film thickness, and was evaluated according to the following criteria.

Specifically, the thickness direction retardation $R_{th}$ was calculated according to the following Equation.

$$R_{th}(nm)=|[(n_x+n_y)/2]-n_z|\times d$$

(wherein, $n_x$ is the largest refractive index among the in-plane refractive indexes of the polyimide polymer film measured with light having a wavelength of 550 nm; $n_y$ is the refractive index perpendicular to $n_x$ among the in-plane refractive indexes of the polyimide polymer film measured with light having a wavelength of 550 nm; $n_z$ is the refractive index in the thickness direction of the polyimide polymer film measured with light having a wavelength of 550 nm; and d is the thickness of the polyimide film.)

⊙: 150 nm or less
O: more than 150 nm and less than 200 nm
X: 200 nm or more

2. Glass Transition Temperature (Tg)

The polyimide films produced in Examples and Comparative Examples were prepared into a size of 5×20 mm, and then the sample was loaded using an accessory. The length of the film actually measured was set to be equal to 16 mm. The pulling force of the film was set to 0.02N, the primary temperature-raising process was performed at a heating rate of 5° C./min in a temperature range of 100 to 350° C., and then the cooling was performed at a rate of 4° C./min in a temperature range of 350 to 100° C., a second temperature-raising process was performed in a temperature range of 100 to 450° C. at a heating rate of 5° C./min, and the mode of thermal expansion change was measured by TMA (Q400 produced by TA). At this time, the inflection point seen in the heating section at the temperature-raising process was obtained as Tg, and evaluated according to the following criteria.

⊙: 400° C. or more
O: more than 350° C. and less than 400° C.
X: 350° C. or less 3. Yellowness Index (YI)

The yellowness index of the polyimide film was measured using a color meter (GRETAGMACBETH's Color-Eye 7000A) and evaluated according to the following criteria.

⊙: 15 or less
o: more than 15 and less than 20
X: 20 or more

4. Haze

The haze value of the polyimide film was measured using a hazemeter (NDH-5000), and evaluated according to the following criteria.

⊙: 1.5% or less
o: more than 1.5% and less than 3%
X: 3% or more

5. Transmittance

In accordance with JIS K 7105, the average transmittance in a wavelength band of 380 nm or more and 780 nm or less was measured with a transmittance meter (model name HR-100, produced by Murakami Color Research Laboratory), and evaluated according to the following criteria.

⊙: 60% or more
o: More than 50% and less than 60%
X: 50% or less

TABLE 1

Experimental Example Measurement Results of Examples and Comparative Examples

| | Category | | | | |
|---|---|---|---|---|---|
| | $R_{th}$ | Tg | YI | Haze(%) | Transmittance(%) @380~780 |
| Example 1 | ⊙ | ⊙ | ⊙ | ⊙ | ⊙ |
| Example 2 | ⊙ | ⊙ | ⊙ | ⊙ | ⊙ |
| Example 3 | ⊙ | ⊙ | ⊙ | ⊙ | ⊙ |
| Comparative Example 1 | X | ⊙ | X | ⊙ | X |
| Comparative Example 2 | ⊙ | X | ⊙ | ⊙ | ⊙ |
| Comparative Example 3 | ⊙ | X | ⊙ | ⊙ | ⊙ |
| Comparative Example 4 | ⊙ | X | ⊙ | ⊙ | ⊙ |
| Comparative Example 5 | ⊙ | X | ⊙ | ⊙ | ⊙ |

As shown in Table 1 above, it was confirmed that the polyimide films obtained in Examples not only show a retardation Rth value of 150 nm or less, which is lower than Comparative Example 1 having a retardation of 200 nm or more, and thus can express visibility suitable for display in the retardation range in the thickness direction, but also the glass transition temperature is as high as 400° C. or more, so it can have excellent heat resistance compared to Comparative Examples 2, 3, 4 and 5 having a low glass transition temperature of 350° C. or less.

The invention claimed is:

1. A polyimide-based polymer film comprising a polyimide-based polymer containing a polyimide repeating unit represented by the following Chemical Formula 1, wherein a glass transition temperature is 400° C. or more, and
a thickness direction retardation value at a thickness of 10 μm is 150 nm or less:

[Chemical Formula 1]

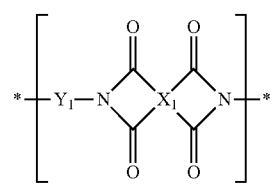

wherein, in the Chemical Formula 1,
$X_1$ is a tetravalent functional group, and
$Y_1$ is an aromatic divalent functional group having 24 or more carbon atoms in which at least one electron-withdrawing functional group is substituted, and
wherein in the Chemical Formula 1, $Y_1$ is substituted with 1 to 3 electron-withdrawing functional groups.

2. The polyimide-based polymer film of claim 1, wherein:
a haze value is 1.5% or less.

3. The polyimide-based polymer film of claim 1, wherein:
a yellowness index value is 15 or less.

4. The polyimide-based polymer film of claim 1, wherein:
an average transmittance at a wavelength of 380 nm or more and 780 nm or less is 60% or more.

5. The polyimide-based polymer film of claim 1, wherein:
in $Y_1$, the aromatic divalent functional group having 24 or more carbon atoms comprises 4 or more aromatic ring compounds.

6. The polyimide-based polymer film of claim 1, wherein:

the aromatic divalent functional group having 24 or more carbon atoms is derived from an aromatic compound having a maximum light absorption wavelength of 280 nm or more and 300 nm or less.

7. The polyimide-based polymer film of claim 1, wherein:

in $Y_1$, the aromatic divalent functional group having 24 or more carbon atoms in which at least one electron-withdrawing functional group is substituted comprises a functional group represented by the following Chemical Formula 2:

[Chemical Formula 2]

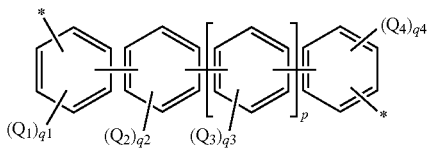

wherein, in the Chemical Formula 2, $Q_1$ to $Q_4$ are the same as or different from each other, and are each independently an electron-withdrawing functional group, q1 to q4 are the same as or different from each other, and are each independently an integer of 0 to 4, and p is an integer of 1 to 10.

8. The polyimide-based polymer film of claim 1, wherein:

in $Y_1$, the aromatic divalent functional group having 24 or more carbon atoms in which at least one electron-withdrawing functional group is substituted comprises a functional group represented by the following Chemical Formula 2-1:

[Chemical Formula 2-1]

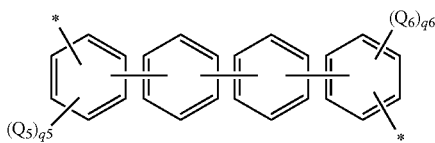

wherein, in the Chemical Formula 2-1, $Q_5$ and $Q_6$ are the same as or different from each other, and are each independently an electron-withdrawing functional group, q5 and q6 are the same as or different from each other, and are each independently an integer of 0 or 1, and q5+q6 is an integer of 1 or 2.

9. The polyimide-based polymer film of claim 1, wherein:

in $Y_1$, the aromatic divalent functional group having 24 or more carbon atoms in which at least one electron-withdrawing functional group is substituted comprises a functional group represented by the following Chemical Formula 2-2:

[Chemical Formula 2-2]

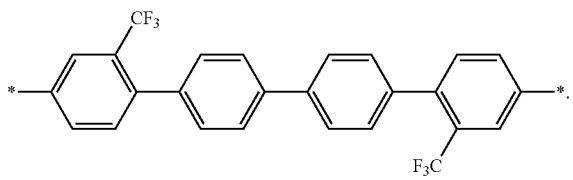

10. The polyimide-based polymer film of claim 1, wherein:

the tetravalent functional group of the $X_1$ comprises an aromatic tetravalent functional group containing a polycyclic ring.

11. The polyimide-based polymer film of claim 1, wherein:

the tetravalent functional group of the $X_1$ comprises a tetravalent functional groups represented by the following Chemical Formula 3:

[Chemical Formula 3]

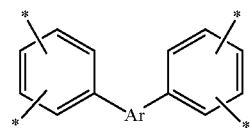

wherein, in the Chemical Formula 3, Ar is a polycyclic aromatic divalent functional group.

12. The polyimide-based polymer film of claim 11, wherein:

in Ar of the Chemical Formula 3, the polycyclic aromatic divalent functional group comprises a fused cyclic divalent functional group containing at least two aromatic ring compounds.

13. The polyimide-based polymer film of claim 11, wherein:

the tetravalent functional group represented by the Chemical Formula 3 comprises a functional group represented by the following Chemical Formula 3-1:

[Chemical Formula 3-1]

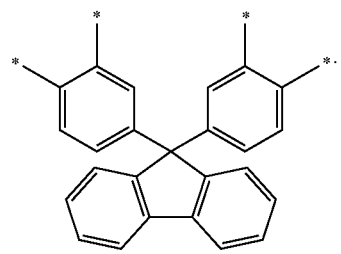

14. The polyimide-based polymer film of claim 1, wherein:

the polyimide-based polymer comprises a combination of a tetracarboxylic dianhydride represented by the following Chemical Formula 4 and an aromatic diamine having 24 or more carbon atoms in which at least one electron-withdrawing functional group is substituted:

[Chemical Formula 4]

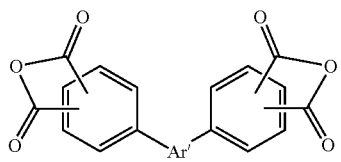

wherein, in the Chemical Formula 4, Ar' is a polycyclic aromatic divalent functional group.

15. The polyimide-based polymer film of claim 1, wherein:
the polyimide-based polymer further comprises a polyimide repeating unit represented by the following Chemical Formula 5 in addition to the polyimide repeating unit represented by the Chemical Formula 1:

[Chemical Formula 5]

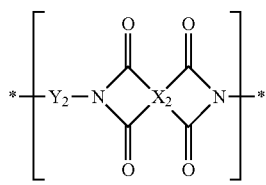

wherein, in the Chemical Formula 5,
$X_2$ is a tetravalent functional group different from that of $X_1$,
$Y_2$ is an aromatic divalent functional group having 24 or more carbon atoms in which at least one electron-withdrawing functional group is substituted.

16. The polyimide-based polymer film of claim 15, wherein:
$X_2$ is one of the tetravalent functional groups represented by the following Chemical Formula 6:

[Chemical Formula 6]

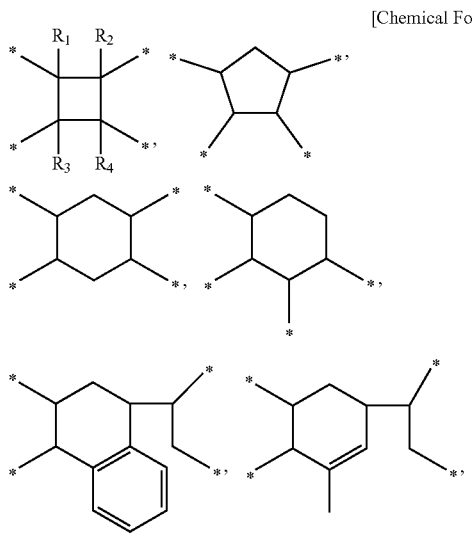

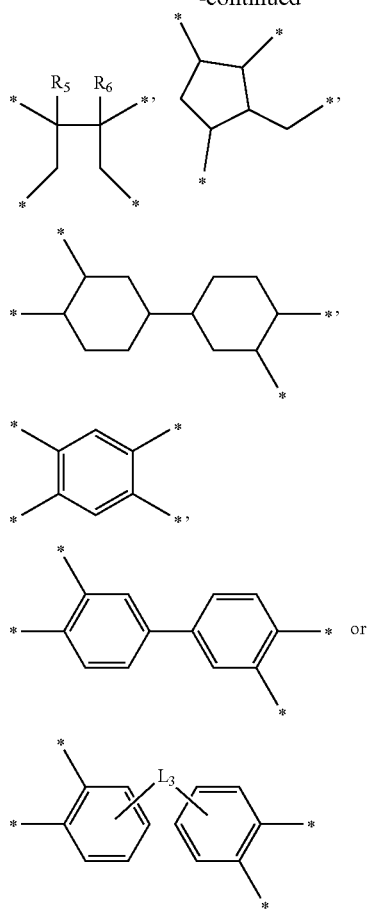

wherein, in the Chemical Formula 6, $R_1$ to $R_6$ are each independently hydrogen or an alkyl group having 1 to 6 carbon atoms, $L_3$ is any one selected from the group consisting of a single bond, —O—, —CO—, —COO—, —S—, —SO—, —SO$_2$—, —CR$_7$R$_8$—, —(CH$_2$)$_t$—, —O(CH$_2$)$_t$O—, —COO(CH$_2$)$_t$OCO—, —CONH—, phenylene and a combination thereof, where $R_7$ and $R_8$ are each independently one of hydrogen, an alkyl group having 1 to 10 carbon atoms, or a halo alkyl group having 1 to 10 carbon atoms, and t is an integer of 1 to 10.

17. The polyimide-based polymer film of claim 15, wherein:
the polyimide repeating unit represented by the Chemical Formula 1 and the polyimide repeating unit represented by the Chemical Formula 5 are contained in an amount of 95 mol % or more with respect to the total repeating units contained in the polyimide-based polymer.

18. A substrate for a display device comprising the polyimide-based polymer film of claim 1.

19. An optical device comprising the polyimide-based polymer film of claim 1.

* * * * *